United States Patent [19]
Kioka et al.

[11] Patent Number: 5,939,495
[45] Date of Patent: Aug. 17, 1999

[54] PROCESS FOR PRODUCING POLYOLEFIN HAVING FUNCTIONAL GROUP AT ITS TERMINAL

[75] Inventors: Mamoru Kioka; Shinichi Kojo, both of Yamaguchi, Japan

[73] Assignee: Mitsui Chemicals, Inc., Tokyo, Japan

[21] Appl. No.: 08/809,926

[22] PCT Filed: Oct. 12, 1995

[86] PCT No.: PCT/JP95/02081

§ 371 Date: Apr. 10, 1997

§ 102(e) Date: Apr. 10, 1997

[87] PCT Pub. No.: WO96/11958

PCT Pub. Date: Apr. 25, 1996

[30] Foreign Application Priority Data

Oct. 13, 1994 [JP] Japan .................................. 6-248193

[51] Int. Cl.$^6$ ...................................................... C08F 8/00
[52] U.S. Cl. ................... 525/356; 525/333.7; 525/333.9; 525/334.1; 525/359.3; 525/383; 525/386
[58] Field of Search ................... 525/356, 359.3, 525/383, 386

[56] References Cited

U.S. PATENT DOCUMENTS

| | | | |
|---|---|---|---|
| 5,185,401 | 2/1993 | Rendina et al. | ...................... 525/333.7 |
| 5,247,021 | 9/1993 | Fujisawa et al. | . |

FOREIGN PATENT DOCUMENTS

| | | |
|---|---|---|
| 0160421 | 11/1985 | European Pat. Off. . |
| 0188915 | 7/1986 | European Pat. Off. . |
| 0350059 | 1/1990 | European Pat. Off. . |
| 0363990 | 4/1990 | European Pat. Off. . |

OTHER PUBLICATIONS

"Ziegler–Natta Catalysts and Polymerization",Boor, Jr.,Academic Press, Inc., New York, 1979,pp. 247–251, 1979.

Abstract of Japanese Laid–Open Patent Appln. No. 63–113003 (May, 18, 1988).

Abstract of Japanese Laid–Open Patent Appln. No. 2–218705 (Aug. 31, 1990).

Shiono, et al. "Synthesis of terminally halogenated isotactic poly(propylene)s using hydroalumination", Die Makromolekulare Chemie, Rapid Communications, 13 (1992) Aug., No. 8, pp. 371–376.

*Primary Examiner*—Bernard Lipman
*Attorney, Agent, or Firm*—Sherman and Shalloway

[57] ABSTRACT

The present invention relates to a process for producing a polyolefin having a functional group at its terminal and the object thereof is to provide a process in which the above polyolefin can be obtained with industrial advantages. This object can be attained by the process comprising step (A) producing a terminal-modified polyolefin of the formula P-AlR$^1$R$^2$, wherein P is a polymer chain and each of R$^1$ and R$^2$ is, for example, a hydrocarbon group having 1 to 10 carbon atoms, in the presence of an olefin polymerization catalyst composed of a solid titanium catalyst component (a) and an organoaluminum compound catalyst component (b) optionally together with an organosilicon compound (c) and step (B) producing a polyoiefin of the formula P-X, wherein P is as defined above and X is a functional group, by conducting a substitution reaction between -AlR$^1$R$^2$ group of the terminal-modified polyolefin obtained in the above step (A) and a compound having a functional group structure or by first conducting a substitution reaction between -AlR$^1$R$^2$ group of the terminal-modified polyolefin obtained in the above step (A) and a compound having such a structure that a functional group is formed by solvolysis and thereafter conducting solvolysis. The polyolefin having a functional group at its terminal is advantageously used as, for example, a compatibilizer for a polymer blend or a starting material in molecular designing.

13 Claims, No Drawings

PROCESS FOR PRODUCING POLYOLEFIN HAVING FUNCTIONAL GROUP AT ITS TERMINAL

TECHNICAL FIELD

The present invention relates to a process for producing a polyolefin having a functional group at its terminal.

BACKGROUND ART

The polyolefin having a functional group at its terminal is advantageously used as, for example, a compatibilizer for a polymer blend, a paint coating property improver or a starting material in molecular designing. The conversion of a terminal group of the polyolefin to a functional group enables improving coating and adherence properties of the polyolefin.

For producing the above polyolefin having a functional group at its terminal, for example, a process using the living polymerization is described in Japanese Patent Laid-open Publication No. 63(1988)-113003. In this process, the polymerization step must be conducted at such low temperatures that the productivity is poor and high cost is inevitable in industrial mass production.

Moreover, Japanese Patent Laid-open Publication No. 2(1990)-218705 describes a process for producing a polyolefin having a functional group at its terminal being represented by the formula P-X wherein P is a polymer chain and X is a functional group, which process comprises step (a) preparing a terminal-modified polyolefin of the formula P-ZnRR' wherein P is as defined above and R and R' are hydrocarbon groups and step substituting the —ZnRR' with a functional group. However, the step (a) must be conducted at low temperatures, for example, about 15 to 25° C., so that it is presumed that the productivity would be poor and high cost would be inevitable in industrial mass production.

The present invention has been made taking the above prior art into account, and the object of the present invention is to provide a process in which a polyolefin having a functional group at its terminal can be obtained with industrial advantages.

DISCLOSURE OF THE INVENTION

The process for producing a polyolefin having a functional group at its terminal according to the present invention comprises:

step (A) producing a terminal-modified polyolefin of the formula:

$$P\text{-}AlR^1R^2 \qquad (I)$$

wherein P represents a polymer chain obtained by a homopolymerization or copolymerization of an olefin of the formula $CH_2=CHR^3$ in which $R^3$ is a group or an atom selected from among hydrocarbon groups having 1 to 10 carbon atoms, a hydrogen atom and halogen atoms and each of $R^1$ and $R^2$ independently represents a group or an atom selected from among hydrocarbon groups having 1 to 10 carbon atoms, a hydrogen atom and halogen atoms, in the presence of an olefin polymerization catalyst composed of a solid titanium catalyst component (a) including titanium, halogen and magnesium as essential components and an organoaluminum compound catalyst component (b) or an olefin polymerization catalyst composed of the above components (a) and (b) and an organosilicon compound (c); and step (B) producing a polyolefin of the formula:

$$P\text{-}X \qquad (II)$$

wherein P represents a polymer chain obtained by a homopolymerization or copolymerization of an olefin of the formula $CH_2=CHR^3$ in which $R^3$ is a group or an atom selected from among hydrocarbon groups having 1 to 10 carbon atoms, a hydrogen atom and halogen atoms and X represents a functional group or a group having at least one functional group, by conducting a substitution reaction between -$AlR^1R^2$ group of the terminal-modified polyolefin obtained in the above step (A) and a compound having a functional group structure or by first conducting a substitution reaction between -$AlR^1R^2$ group of the terminal-modified polyolefin obtained in the above step (A) and a compound having such a structure that a functional group is formed by solvolysis and thereafter conducting solvolysis.

The present invention enables producing the polyolefin having a functional group at its terminal by an industrially advantageous process.

In the present invention, it is preferred that, in the formula (I), P represent a polymer chain obtained by a homopolymerization or copolymerization of at least 20 olefin monomer units, especially, 50 to 10,000 olefin monomer units. Further, it is preferred that, in the step (A), an olefin be polymerized at 70° C. or higher. Still further, it is preferred that, in the formula (II), X represent —COOR or —OR, each of these Rs being a hydrocarbon group having 1 to 10 carbon atoms or a hydrogen atom, or a halogen and that the polyolefin represented by the formula (II) have an Mw/Mn ratio of at least 3. Still further, it is preferred that the step (A) be performed in the absence of hydrogen.

BEST MODE FOR CARRYING OUT THE INVENTION

The process for producing a polyolefin having a functional group at its terminal according to the present invention will be described in detail below.

The process for producing a polyolefin having a functional group at its terminal according to the present invention includes:

step (A) producing a terminal-modified polyolefin is produced in the presence of an olefin polymerization catalyst composed of a solid titanium catalyst component (a) and an organoaluminum compound catalyst component (b); and step (B) producing a polyolefin of the formula:

$$P\text{-}X \qquad (II)$$

wherein P represents a polymer chain obtained by a homopolymerization or copolymerization of an olefin of the formula $CH_2=CHR^3$ in which $R^3$ is a group or an atom selected from among hydrocarbon groups having 1 to 10 carbon atoms, a hydrogen atom and halogen atoms and X represents a functional group or a group having at least one functional group, by conducting a substitution reaction between the terminal group of the terminal-modified polyolefin obtained in the above step (A) and a compound having a functional group structure or by first conducting a substitution reaction between the terminal group of the terminal-modified polyolefin obtained in the above step (A) and a compound having such a structure that a functional group is formed by solvolysis and thereafter conducting solvolysis.

First, the olefin polymerization catalyst employed in the present invention will be described.

The solid titanium catalyst component (a) as a constituent member of the olefin polymerization catalyst for use in the present invention can be prepared by contacting the following magnesium compound, titanium compound and electron donor with each other.

The titanium compound which can be used in the preparation of the solid titanium catalyst component (a) is, for example, a tetravalent titanium compound the formula:

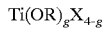

wherein R represents a hydrocarbon group, X represents a halogen atom and g satisfies the relationship:

$$0 \leq g \leq 4.$$

Specific examples of such titanium compounds include:
titanium tetrahalides such as $TiCl_4$, $TiBr_4$ and $TiI_4$,
alkoxytitanium trihalides such as $Ti(OCH_3)Cl_3$, $Ti(OC_2H_5)Cl_3$, $Ti(On-C_4H_9)Cl_3$, $Ti(OC_2H_5)Br_3$ and $Ti(Oiso-C_4H_9)Br_3$,
alkoxytitanium dihalides such as $Ti(OCH_3)_2Cl_2$, $Ti(OC_2H_5)_2Cl_2$, $Ti(On-C_4H_9)_2Cl_2$ and $Ti(OC_2H_5)_2Br_2$,
alkoxytitanium monohalides such as $Ti(OCH_3)_3Cl$, $Ti(OC_2H_5)_3Cl$, $Ti(On-C_4H_9)_3Cl$ and $Ti(OC_2H_5)_3Br$ and
tetraalkoxytitaniums such as $Ti(OCH_3)_4$, $Ti(OC_2H_5)4$, $Ti(On-C_4H_9)_4$, $Ti(Oiso-C_4H_9)_4$ and $Ti(O-2-ethylhexyl)_4$. Of these, halogen-containing titanium compounds are preferred, titanium tetrahalides are still preferred, and titanium tetrachloride is especially preferred. The above titanium compounds may be used either individually or in combination. Moreover, each of the above titanium compounds may be diluted with a hydrocarbon compound or a halogenated hydrocarbon compound before use.

Both a magnesium compound having reducing capability and a magnesium compound having no reducing capability can be used in the preparation of the solid titanium catalyst component (a).

The above magnesium compound having reducing capability is, for example, a magnesium compound having a magnesium-carbon bond or a magnesium-hydrogen bond.

Examples of such magnesium compounds having reducing capability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium and butylmagnesium hydride. These magnesium compounds may be used either individually or in the form of a complex with the below described organoaluminum compound. Each of these magnesium compounds may be either liquid or solid and may be derived by reacting metallic magnesium with a counterpart compound. Moreover, the above magnesium compound can be derived from metallic magnesium during the preparation of the catalyst by the use of the above method.

Examples of suitable magnesium compounds having no reducing capability include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxymagnesium chloride and methylphenoxymagnesium chloride; alkoxymagnesiums such as ethoxymagnesium, isopropoxymagnesium, butoxymagnesium, n-octoxy-magnesium and 2-ethylhexoxymagnesium; aryloxymagnesiums such as phenoxymagnesium and dimethylphenoxymagnesium; and magnesium carboxylate salts such as magnesium laurate and magnesium stearate.

This magnesium compound having no reducing capability may be a compound derived from the above magnesium compound having reducing capability or a compound derived during the preparation of catalyst component. The derivation of the magnesium compound having no reducing capability from the magnesium compound having reducing capability can be accomplished, for example, by contacting the magnesium compound having reducing capability with a halogen, a polysiloxane compound, a halogen-containing organosilicon compound, a halogen-containing aluminum compound or a compound having active carbon to oxygen bond such as an alcohol, an ester, a ketone or an aldehyde.

Not only the above magnesium compound having reducing capability or magnesium compound having no reducing capability but also a complex or double compound made of the above magnesium compound together with another metal or a mixture of the above magnesium compound and another metal compound may be used as the magnesium compound in the present invention. The above compounds may also be used in combination.

Although a variety of magnesium compounds other than mentioned above can also be used as the magnesium compound in the preparation of the solid titanium catalyst component (a), it is preferred that the magnesium compound be in the form of a halogen-containing magnesium compound in the finally obtained solid titanium catalyst component (a). Therefore, when a magnesium compound which contains no halogen is used, it is preferred that, during the preparation, the magnesium compound be contacted and reacted with a halogen-containing compound.

Of the above magnesium compounds, magnesium compounds having no reducing capability are preferred. Halogen-containing magnesium compounds are especially preferred, and magnesium chloride, alkoxymagnesium chlorides and aryloxymagnesium chlorides are most especially preferred.

The solid titanium catalyst component (a) for use in the present invention is formed by bringing the above magnesium compound and the titanium compound set forth hereinbefore together with an electron donor (i) added according to necessity into mutual contacts.

Examples of suitable electron donors (i) employed in the preparation of the solid titanium catalyst component (a) include oxygen-containing electron donors such as alcohols, esters, ethers, phenols, ketones, aldehydes, carboxylic acids, organic acid halides, acid amides, acid anhydrides and alkoxysilanes; and nitrogen-containing electron donors such as ammonias, amines, nitrites, pyridines and isocyanates.

Specific examples of the above alcohols include methanol, ethanol, propanol, trichloromethanol, trichloroethanol and trichlorohexanol.

Specific examples of the above esters include:
organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, γ-butyrolactone, δ-valerolactone, coumarin, phthalide and ethyl carbonate;

metallic acid esters such as titanic esters, vanadic esters, niobic esters and zirconic esters;

orthotitanic esters such as methyl orthotitanate, ethyl orthotitanate, n-propyl orthotitanate, i-propyl orthotitanate, n-butyl orthotitanate, i-butyl orthotitanate, n-amyl orthotitanate, 2-ethylhexyl orthotitanate, n-octyl orthotitanate, phenyl orthotitanate and cyclohexyl orthotitanate; polytitanic esters such as methyl polytitanate, ethyl polytitanate, n-propyl polytitanate, i-propyl polytitanate, n-butyl polytitanate, i-butyl polytitanate, n-amyl polytitanate, 2-ethylhexyl polytitanate, n-octyl polytitanate, phenyl polytitanate and cyclohexyl polytitanate; vanadic, niobic and zirconic esters corresponding to the above titanic esters having its metal atom substituted with vanadium, niobium and zirconium, respectively.

Further, the above esters can be polycarboxylic esters having skeletons represented by the formulae:

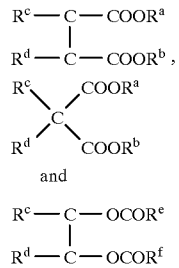

and wherein $R^a$ represents an unsubstituted or substituted hydrocarbon group; each of $R^b$, $R^e$ and $R^f$ represents a hydrogen atom or an unsubstituted or substituted hydrocarbon group; and each of $R^c$ and $R^d$ represents a hydrogen atom or an unsubstituted or substituted hydrocarbon group, although it is preferred that at least one thereof represent an unsubstituted or substituted hydrocarbon group; wherein $R^c$ and $R^d$ may be bonded to each other to thereby form a ring structure;

and wherein, when the hydrocarbon groups $R^a$–$R^f$ are substituted, the substituents contain heteroatoms such as N, O and S and have groups such as C—O—C, COOR, COOH, OH, $SO_3H$, —C—N—C— and $NH_2$.

The above polycarboxylic esters are, for example,
aliphatic polycarboxylic esters,
alicyclic polycarboxylic esters,
aromatic polycarboxylic esters and
heterocyclic polycarboxylic esters.

Specific examples of suitable polycarboxylic esters include n-butyl maleate, diisobutyl methylmalonate, di-n-hexyl cyclohexenecarboxylate, diethyl ester of Nadic Acid, diisopropyl tetrahydrophthalate, diethyl phthalate, diisobutyl phthalate, di-n-butyl phthalate, di-2-ethylhexyl phthalate and dibutyl 3,4-furandicarboxylate.

The above ethers are, for example, ethers having 2 to 20 carbon atoms such as methyl ether, ethyl ether, isopropyl ether, butyl ether, amyl ether, tetrahydrofuran, anisole and diphenyl ether.

Further, the ethers can be polyether compounds represented by the formula:

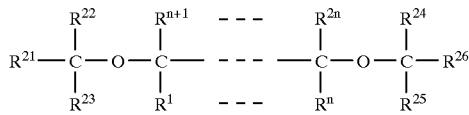

wherein n is an integer satisfying the relationship: $2 \leq n \leq 10$ and each of $R^1$ to $R^{26}$ represents a substituent having at least one element selected from among carbon, hydrogen, oxygen, halogen, nitrogen, sulfur, phosphorus, boron and silicon provided that arbitrary members of $R^1$ to $R^{26}$, preferably, $R^1$ to $R^{20}$, may cooperate to form a ring other than benzene ring, and wherein the principal chain may contain a noncarbon atom.

Of the above polyether compounds, 1,3-diethers are preferred, of which 2,2-diisobutyl-1,3-dimethoxypropane, 2-isopropyl-2-isopentyl-1,3-dimethoxypropane, 2,2-dicyclohexyl-1,3-dimethoxypropane, 2,2-bis (cyclohexylmethyl)-1,3-dimethoxypropane, 2-isopropyl-2-cyclohexyl-1,3-dimethoxypropane, 2-isopropyl-2-s-butyl-1, 3-dimethoxypropane, 2,2-diphenyl-1,3-dimethoxypropane and 2-isopropyl-2-cyclopentyl-1,3-dimethoxypropane are especially preferred.

Examples of the above phenols include phenols having 6 to 20 carbon atoms which may contain lower alkyls, such as phenol, cresol, xylenol, ethylphenol, propylphenol, nonylphenol, cumylphenol and naphthol.

Examples of the above ketones include ketones having 3 to 15 carbon atoms, such as acetone, methyl ethyl ketone, methyl isobutyl ketone, acetophenone, benzophenone and benzoquinone.

Examples of the above aldehydes include aldehydes having 2 to 15 carbon atoms, such as acetaldehyde, propionaldehyde, octylaldehyde, benzaldehyde, trialdehyde and naphthoaldehyde.

Examples of the above organic acid halides include acid halides having 2 to 15 carbon atoms, such as acetyl chloride, benzoyl chloride, toluylic acid chloride and anisic acid chloride.

Examples of the above acid amides include acetic acid N,N-dimethylamide, benzoic acid N,N-diethylamide and toluylic acid N,N-dimethylamide.

Examples of the above acid anhydrides include acetic anhydride, phthalic anhydride and benzoic anhydride.

Examples of the above amines include trimethylamine, triethylamine, tributylamine, tribenzylamine and tetramethylethylenediamine.

Examples of the above pyridines include pyridine, methylpyridine, ethylpyridine and dimethylpyridine.

The above electron donors may also be used in combination of two or more.

In bringing the above titanium compound and magnesium compound together with the electron donor (i) added according to necessity into mutual contacts, the following granular carrier can be caused to be present therein to thereby prepare a solid titanium catalyst component (a) of the carrier supported type.

Examples of suitable carriers include inorganic carriers of $Al_2O_3$, $SiO_2$, $B_2O_3$, MgO, CaO, $TiO_2$, ZnO, $Zn_2O$, $SnO_2$, BaO and ThO and organic carriers of styrene/divinylbenzene copolymers. Of these, $SiO_2$, $Al_2O_3$, MgO, ZnO and $Zn_2O$ are preferred.

The above components may also be brought into mutual contacts in the presence of another reactant such as silicon, phosphorus and aluminum.

The solid titanium catalyst component (a) can be produced by bringing the above titanium compound and magnesium compound together with the electron donor (i) added according to necessity into mutual contacts according to a large variety of processes which include those conventionally employed.

Some specific examples of the processes for producing the above solid titanium catalyst component (a) will be briefly described below.

Process (1) in which a hydrocarbon solvent solution of a magnesium compound and an electron donor is subjected to a catalytic reaction with an organoaluminum compound to thereby precipitate a solid and a catalytic reaction of the resultant solid with a titanium compound is conducted thereafter or during the precipitation.

Process (2) in which a complex composed of a magnesium compound and an electron donor is contacted with an organoaluminum compound and reacted and a catalytic reaction of the resultant material with a titanium compound is performed.

Process (3) in which an organomagnesium compound is contacted with an inorganic carrier and a catalytic reaction of the resultant material with a titanium compound preferably together with an electron donor is conducted. In this process, the above material resulting from the contact may be subjected to a catalytic reaction with a halogen-containing compound and/or an organoaluminum compound in advance.

Process (4) in which a solution of a magnesium compound and an electron donor optionally containing a hydrocarbon solvent is mixed with an inorganic or organic carrier to thereby obtain an inorganic or organic carrier having the magnesium compound supported thereon and the obtained carrier supported magnesium compound is contacted with a titanium compound.

Process (5) in which a solution of a magnesium compound, a titanium compound and an electron donor optionally containing a hydrocarbon solvent is contacted with an inorganic or organic carrier to thereby obtain a solid titanium catalyst component wherein magnesium and titanium are supported thereon.

Process (6) in which a liquid organomagnesium compound is subjected to a catalytic reaction with a halogen-containing titanium compound.

Process (7) in which a liquid organomagnesium compound is subjected to a catalytic reaction with a halogen-containing compound and thereafter contacted with a titanium compound.

Process (8) in which a magnesium compound having an alkoxy group is subjected to a catalytic reaction with a halogen-containing titanium compound.

Process (9) in which a complex composed of a magnesium compound having an alkoxy group and an electron donor is subjected to a catalytic reaction with a titanium compound.

Process (10) in which a complex composed of a magnesium compound having an alkoxy group and an electron donor is contacted with an organoaluminum compound and then subjected to a catalytic reaction with a titanium compound.

Process (11) in which a magnesium compound, an electron donor and a titanium compound are mutually contacted and reacted in arbitrary order. In this process, each of the components may undergo a preliminary treatment with a reaction auxiliary such as an electron donor and/or an organoaluminum compound or a halogen-containing silicon compound.

Process (12) in which a liquid magnesium compound having no reducing capability and a liquid titanium compound are reacted with each other preferably in the presence of an electron donor to thereby precipitate a solid magnesium/titanium complex.

Process (13) in which the reaction product obtained in the process (12) is further reacted with a titanium compound.

Process (14) in which the reaction product obtained in the process (11) or (12) is further reacted with an electron donor and a titanium compound.

Process (15) in which a magnesium compound, preferably together with an electron donor, and a titanium compound are pulverized to thereby obtain a solid material and the solid material is treated with any of a halogen, a halogen compound and an aromatic hydrocarbon. This process may include a step in which only the magnesium compound, or a complex composed of the magnesium compound and the electron donor or the magnesium compound and the titanium compound are pulverized. Further, after the pulverization, the obtained powder may be pretreated with a reaction auxiliary and then treated with, for example, a halogen. For example, an organoaluminum compound or a halogen-containing silicon compound is used as the reaction auxiliary.

Process (16) in which a magnesium compound is pulverized and then contacted and reacted with a titanium compound. In this process, it is preferred that the pulverization and/or the contacting and reaction be effected in the presence of an electron donor and a reaction auxiliary.

Process (17) in which each of the compounds obtained in the above processes (11) to (16) is treated with a halogen, a halogen compound or an aromatic hydrocarbon.

Process (18) in which a catalytic reaction of a metal oxide, an organomagnesium compound and a halogen-containing compound is performed and, preferably, the reaction product is contacted with an electron donor and a titanium compound.

Process (19) in which a magnesium compound such as a magnesium salt of organic acid, an alkoxymagnesium or an aryloxymagnesium is reacted with a titanium compound and/or a halogen-containing hydrocarbon, preferably together with an electron donor.

Process (20) in which a hydrocarbon solution containing at least a magnesium compound and an alkoxytitanium is contacted with a titanium compound and/or an electron donor. It is preferred that this process be performed in the presence of a halogen-containing compound such as a halogen-containing silicon compound.

Process (21) in which a liquid magnesium compound having no reducing capability is reacted with an organoaluminum compound to thereby precipitate a solid magnesium/metal (aluminum) complex and this complex is reacted with an electron donor and a titanium compound.

Although the amount of the above components used in the preparation of the solid titanium catalyst component (a) depends on the preparation process and cannot be uniformly defined, for example, the titanium compound is generally used in an amount of 0.01 to 1000 mol, preferably, 0.1 to 200 mol per mol of the magnesium compound. The electron donor added according to necessity is generally used in an amount of 0.01 to 5 mol, preferably, 0.1 to 1 mol per mol of the magnesium compound.

The thus obtained solid titanium catalyst component (a) contains magnesium, titanium and a halogen.

In the solid titanium catalyst component (a), it is preferred that the atomic ratio of halogen/titanium range from about 2 to 200, especially, from about 4 to 100, that the molar ratio of electron donor/titanium range from about 0.01 to 100, especially, from about 0.2 to 10 and that the atomic ratio of magnesium/titanium range from about 1 to 100, especially, from about 2 to 50.

The organoaluminum compound catalyst component (b) for use in the present invention is, for example, a compound represented by the formula:

$$R^g_n AlX_{3-n}$$

wherein $R^g$ represents a hydrocarbon group having 1 to 12 carbon atoms, X represents a halogen or hydrogen, and n is a number of 1 to 3.

Specific examples of suitable organoaluminum compounds include:

trialkylaluminums such as trimethylaluminum, triethylaluminum, triisopropylaluminum, triisobutylaluminum, trioctylaluminum and tri-2-ethylhexylaluminum;

alkenylaluminums such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

The catalyst for olefin polymerization employed in the present invention contain the above solid titanium catalyst component (a) and the above organoaluminum compound catalyst component (b) and further may contain the above electron donor (i) and/or the electron donor (ii) set forth below.

The electron donor (ii) is, for example, an organosilicon compound (c) represented by the formula:

$$R_n Si(OR')_{4-n}$$

wherein R and R' are hydrocarbon groups and n satisfies the relationship: 0<n<4.

Specific examples of suitable organosilicon compounds (c) include ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

Further, examples of the electron donors (ii) include:

nitrogen-containing electron donors, e.g., 2,6-substituted piperidines and 2,5-substituted piperidines, substituted methylenediamines such as N,N,N',N'-tetramethylmethylenediamine and N,N,N',N'-tetraethylmethylenediamine, and substituted methylenediamines such as 1,3-dibenzylimidazolidine and 1,3-dibenzyl-2-phenylimidazolidine;

phosphorus-containing electron donors, e.g., phosphites such as triethyl phosphite, tri-n-propyl phosphite, triisopropyl phosphite, tri-n-butyl phosphite, triisobutyl phosphite, diethyl-n-butyl phosphite and diethylphenyl phosphite; and oxygen-containing electron donors, e.g., 2,6-substituted tetrahydropyrans and 2,5-substituted tetrahydropyrans.

The above electron donors (ii) are used either individually or in combination.

In the present invention, the step (A) for producing the terminal-modified polyolefin represented by the below given formula (I) is carried out in the presence of the above catalyst for olefin polymerization:

$$P\text{-}AlR^1R^2 \qquad (I).$$

In the formula (I), P represents a polymer chain obtained by a homopolymerization or copolymerization of an olefin of the formula $CH^2=CHR^3$ in which $R^3$ is a group or an atom selected from among hydrocarbon groups having 1 to 10 carbon atoms, a hydrogen atom and halogen atoms.

Examples of suitable olefins of the formula $CH_2=CHR^3$ include ethylene, propylene and butene. Of these, propylene is especially preferred.

Each of $R^1$ and $R^2$ independently represents a group or an atom selected from among hydrocarbon groups having 1 to 10 carbon atoms, hydrogen atom and halogen atoms.

Examples of the hydrocarbon groups each having 1 to 10 carbon atoms include methyl, ethyl, propyl, butyl, pentyl, octyl and decyl groups. Of these, methyl and ethyl groups are preferred.

In the present invention, P of the above formula (I) is preferred to be a polymer chain obtained by a homopolymerization or copolymerization of at least 20 olefins, especially, 50 to 100,000 olefins, still especially, 50 to 10,000 olefins and, most especially, 100 to 10,000 olefins.

The polymerization for obtaining the terminal-modified polyolefin represented by the above formula (I) is conducted by, for example, the solvent suspension polymerization method or the suspension polymerization method in which a liquid olefin is used as the solvent.

In performing the solvent suspension polymerization, a hydrocarbon having no polymerization activity can be used as the polymerization solvent.

Examples of the inert hydrocarbon solvents employed in the solvent suspension polymerization include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. Of these, aliphatic hydrocarbons are preferably used.

In the polymerization reaction system, the solid titanium catalyst component (a) is generally added in an amount of about 0.0001 to 50 mmol, preferably, about 0.001 to 10 mmol in terms of the quantity of titanium atom per liter of the polymerization volume. The organoaluminum compound catalyst component (b) is generally used in an amount of 1 to 2000 mol, preferably, 2 to 1000 mol per mol of titanium atom present in the polymerization reaction system. According to necessity, the organosilicon compound (c) is generally used in an amount of 0.001 to 30 mol, preferably, 0.01 to 10 mol per mol of titanium atom present in the polymerization reaction system.

In the polymerization step, it is preferred that the hydrogen concentration per mol of monomer be 0 to 0.01 mol, especially, 0 to 0.005 mol and, still especially, 0 to 0.001 mol. It is most especially preferred that no hydrogen be added to the polymerization reaction system in the polymerization step of the present invention.

The polymerization temperature is generally preferred to be at least 70° C., especially, in the range of from 80 to 150° C., still especially, from 85 to 140° C. and, most especially, from 90 to 130° C.

The polymerization pressure is generally set at atmospheric pressure to 100 kg/cm², preferably, atmospheric pressure to 50 kg/cm².

In the polymerization reaction of olefin, the mechanism of chain transfer reaction can be classified into four types, i.e., the chain transfer by the organoaluminum compound (1), the chain transfer by hydrogen abstraction (2), the chain transfer by the hydrogen (3) and the chain transfer by the monomer (4). When the chain transfer by the organoaluminum compound occurs, the polyolefin whose terminal is a group of the formula —AlR$^1$R$^2$ is formed. Either when the polymerization reaction is performed without the addition of hydrogen or when the polymerization reaction is performed at the above polymerization temperature in the olefin polymerization step, the chain transfer reaction by the organoaluminum compound is promoted with the result that the proportion of terminal-modified polyolefin represented by the formula (I) is high in the product. When the polymerization reaction is performed at the above polymerization temperature without the addition of hydrogen in the olefin polymerization step, the chain transfer reaction by the organoaluminum compound is more effectively promoted with the result that the proportion of terminal-modified polyolefin represented by the formula (I) is higher in the product.

The olefin polymerization can be conducted by any of the batchwise, semi-continuous and continuous methods.

The thus prepared terminal-modified polyolefin represented by the above formula (I) is generally obtained in the form of a slurry.

The presence of the —AlR$^1$R$^2$ group at the terminal of the obtained terminal-modified polyolefin as shown in the above formula (I) can be presumed by the following analysis. That is, the obtained slurry is added to a liquid mixture of hydrochloric acid, methanol and acetone, and the terminals of the polymer formed by a solvolysis are analyzed by the use of $^{13}$C-NMR. When the polyolefin contained in the slurry has the —AlR$^1$R$^2$ group at its terminal, only an ethyl group and an i-butyl group are detected at the molecular terminals of the polymer formed by the solvolysis. The ratio of detected ethyl group to i-butyl group is nearly 1:1.

For example, when propylene is polymerized with the use of triethylaluminum as the organoaluminum compound catalyst component, the polymerization reaction is presumed to proceed in the following scheme:

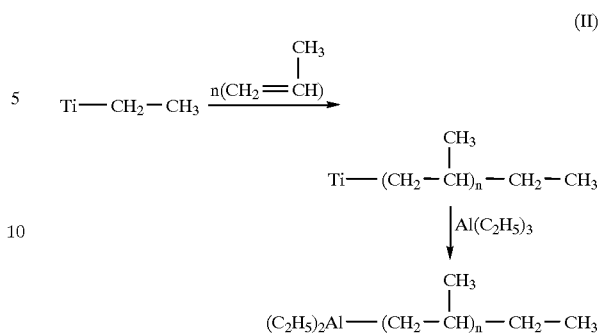

The solvolysis of the above polymer (II) in the liquid mixture of hydrochloric acid, methanol and acetone leads to the formation of polymer (III) whose molecular terminals are ethyl and i-butyl groups as in the following scheme:

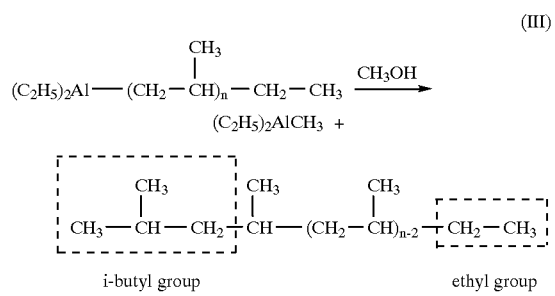

As apparent from the above, when a molecular terminal of the polymer is the —AlR$^1$R$^2$ group, only an ethyl group and an i-butyl group are detected at the molecular terminals and the ratio of detected ethyl group to i-butyl group is 1:1. On the other hand, when the terminal of the polymer is a group other than the —AlR$^1$R$^2$ group, for example, an alkyl group, the solvolysis does not occur and one of the terminal groups of the polymer is an n-propyl group.

Thereafter, step (B) for producing a polyolefin of the formula:

$$P\text{-}X \qquad (II)$$

wherein P is as defined above, is carried out, which step (B) comprises:
  conducting a substitution reaction between the —AlR$^1$R$^2$ group of the terminal-modified polyolefin obtained in the above step (A) and a compound having a functional group structure (1), or
  first conducting a substitution reaction between the —AlR$^1$R$^2$ group of the terminal-modified polyolefin obtained in the above step (A) and a compound having such a structure that a functional group is formed by solvolysis and thereafter conducting solvolysis (2).

In the formula (II), X represents a functional group or a group having at least one functional group and, for example, is preferred to represent —COOR or —OR, each of these Rs being a hydrocarbon group having 1 to 10 carbon atoms or a hydrogen atom, or a halogen.

The above substitution reaction between the —AlR$^1$R$^2$ group of the terminal-modified polyolefin obtained in the above step (A) and a compound having a functional group structure or a compound having such a structure that a functional group is formed by solvolysis is generally carried out at 0 to 300° C., preferably, 10 to 200° C. for a period of 0 to 100 hr, preferably, 0.5 to 50 hr.

Examples of suitable compounds having a functional group structure include halogen gases, methyl chloroformate and phthalic acid chloride.

Examples of suitable compounds having such a structure that a functional group is formed by solvolysis include oxygen, carbon monoxide and carbon dioxide.

The solvolysis subsequent to the substitution reaction is generally performed at 0 to 100° C., preferably, 10 to 80° C. for a period of 0 to 100 hr, preferably, 0.5 to 50 hr. The solvolysis is conducted in a solvent such as methanol, ethanol, propanol, butanol or water.

It is preferred that the thus obtained polyolefin represented by the above formula (II) have an Mw/Mn ratio of at least 3, especially, 3 to 15 and, still especially, 4 to 14.

The above process of the present invention enables effectively producing the polyolefin having a functional group at its terminal as represented by the above formula (II). Especially, the addition of no hydrogen in the step (A) and the execution of polymerization reaction at the above polymerization temperature enable obtaining a polyolefin in which the content of terminal-modified polyolefin is high, thereby enabling more effectively producing the desired polyolefin having a functional group at its terminal.

The obtained polyolefin having a functional group at its terminal can be used as, for example, a compatibilizer for a polymer blend, a paint coating property improver or a starting material in molecular designing. The conversion of a terminal group of the polyolefin to a functional group enables improving coating and adherence properties of the polyolefin.

EFFECT OF THE INVENTION

The present invention enables providing a process in which the polyolefin having a functional group at its terminal can be obtained with industrial advantages.

EXAMPLE

The present invention will be further illustrated below with reference to the following Examples, which in no way limit the scope of the invention.

Example 1

[Preparation of solid titanium catalyst component (A)]

20 g of anhydrous magnesium chloride and 11.88 ml (0.03 mmol) of dioctyl phthalate were charged in nitrogen atmosphere into a stainless steel (SUS-32) ball mill cylinder of 800 ml in internal volume and 100 mm in inside diameter having 2.8 kg of stainless steel (SUS-32) balls of 15 mm in diameter introduced therein and simultaneously pulverized for 8 hr, thereby obtaining an activated magnesium chloride. 10 g of the obtained activated magnesium chloride was transferred into a 400 ml four-necked glass flask thoroughly purged with nitrogen, and 150 ml of titanium tetrachloride was added thereto. The resultant slurry was heated to 80° C. with stirring and a thermal reaction was conducted at that temperature for 2 hr. The slurry was filtered through a jacketed filter having been heated at 80° C. in advance and having thoroughly been purged with nitrogen to thereby separate a solid. This solid was washed with purified decane heated at 80° C. once, with room temperature decane once and with room temperature hexane thrice to thereby obtain a solid titanium catalyst component (A). This solid titanium catalyst component (A) was stocked in the form of a decane slurry.

[Synthesis of terminal-modified polyolefin (B)]

A glass reactor of 1 lit. in internal volume was thoroughly purged with nitrogen, and 500 ml of purified decane was placed therein. Propylene gas was fed into the liquid phase portion at 50 lit./hr and excess gas was expelled from the top of the gas phase portion, so that the pressure inside the reactor was held at the same as atmospheric pressure. Subsequently, the reactor was heated on an oil bath and, when the internal temperature became 100° C., 3 mmol of triethylaluminum, 0.3 mmol of diphenyldimethoxysilane and 0.05 mmol, in terms of titanium atom, of the above solid titanium catalyst component (A) were charged in this order. The mixture was held at that temperature for 1 hr, and propylene gas was fed at 50 lit./hr so that a polymerization reaction was performed for 1 hr. Then, the propylene gas was switched to nitrogen gas to thereby expel unreacted propylene gas. Thus, the reaction was completed and a decane slurry containing terminal-modified polyolefin (B) was obtained.

[Identification of terminal-modified polyolefin (B)]

Part of the above obtained slurry was added to a liquid mixture of a small amount of 10% hydrochloric acid, 2 lit. of acetone and 2 lit. of methanol and stirred. Precipitated polymer was separated from a liquid phase by filtration through a glass filter (G3) and dried in vacuum at 80° C. for 12 hr. Thus, a white polymer was obtained.

150 mg of this white polymer was dissolved in a mixture of 0.5 ml of hexachlorobutadiene and 0.1 ml of benzene deuteride at 120° C. The thus obtained sample was analyzed at 125 MHz by means of $^{13}$C-NMR (JEOL GX-500 manufactured by JEOL LTD.) under the following conditions:
pulse angle 45°,
pulse repetition 4.2 sec,
spectral width 7500 Hz,
scanning number 20,000,
temperature 110° C., and
data point 64 KB.

A study of the obtained results showed that only an ethyl group and an i-butyl group were detected at the molecular terminals of the white polymer and the molar ratio of detected ethyl group to i-butyl group was 1:1. Therefore, it is presumed that the polyolefin contained in the above decane slurry has an —Al($C_2H_5$)$_2$ group at its terminal.

[Synthesis of polyolefin (C) having a functional group at its terminal]

The above obtained decane slurry was held at 60° C., and the nitrogen gas was switched to oxygen gas. While maintaining the above temperature, oxygen gas was continuously fed into the slurry at 20 N-lit./hr for 3 hr. The resultant mixture was put in a liquid mixture of a small amount of concentrated hydrochloric acid and 2 lit. of methanol and stirred. The stirring was conducted for 30 min, 2 lit. of methanol was added and further stirring was conducted for 30 min. Precipitated polymer was separated by filtration through a glass filter (G3), washed with methanol and dried in vacuum at 60° C. for 8 hr. As a result, 1.9 g of polymer was obtained. The molecular weight (in terms of polypropylene) of this polymer was measured by gel permeation chromatography (GPC), and Mn and Mw were found to be 9800 and 99,200, respectively.

150 mg of this polymer was dissolved in a mixture of 0.5 ml of hexachlorobutadiene and 0.1 ml of benzene deuteride at 120° C. The thus obtained sample was analyzed by means of $^{13}$C-NMR in the same manner as described above, thereby determining terminal group of the polymer.

A peak assigned to secondary carbon of a polypropylene terminal of isobutyl group structure which neighbored hydroxyl group (HO—) was clearly recognized at δ (ppm)= 67.8. Therefore, the presence of polypropylene having a terminal of the following structure was demonstrated:

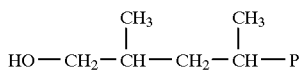

wherein P represents a polymer chain group.

Example 2

[Synthesis of polyolefin (C)-2 having a functional group at its terminal]

The decane slurry of terminal-modified polyolefin (B) obtained in the same manner as in Example 1 was allowed to cool to room temperature, and 10 ml (120 mmol) of N-methylimidazole was added thereto. The feeding of nitrogen gas was switched to the feeding of chlorine gas, and the stirring was continued until heat evolution was no longer recognized. Thereafter, the resulting mixture was put in a liquid mixture of a small amount of concentrated hydrochloric acid and 2 lit. of methanol and stirred for 30 min. Then, 2 lit. of methanol was added and further stirring was conducted for 30 min. Precipitated polymer was separated by filtration through a glass filter (G3), washed with methanol and dried in vacuum at 60° C. for 8 hr. As a result, 2.1 g of polymer was obtained. The molecular weight (in terms of polypropylene) of this polymer was measured by GPC, and Mn and Mw were found to be 9500 and 98,700, respectively.

150 mg of this polymer was dissolved in a mixture of 0.5 ml of hexachlorobutadiene and 0.1 ml of benzene deuteride at 120° C. The thus obtained sample was analyzed by means of $^{13}$C-NMR in the same manner as in Example 1, thereby determining terminal group of the polymer.

A peak assigned to secondary carbon of a polypropylene terminal of isobutyl group structure which neighbored chloride group (Cl—) was clearly recognized at δ (ppm)=49.8. Therefore, the presence of polypropylene having the following structure was demonstrated:

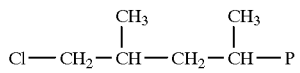

wherein P represents a polymer chain group.

Example 3

[Synthesis of polyolefin (C)-3 having a functional group at its terminal]

The decane slurry of terminal-modified polyolefin (B) obtained in the same manner as in Example 1 was maintained at 70° C., and 7.0 ml (90 mmol) of methyl chloroformate was added thereto. The feeding of nitrogen gas was stopped, and the mixture was maintained at that temperature for 8 hr under stirring. The resultant slurry was put in a liquid mixture of a small amount of concentrated hydrochloric acid and 2 lit. of methanol and stirred for 30 min. Then, 2 lit. of methanol was added and further stirring was conducted for 30 min. Precipitated polymer was separated by filtration through a glass filter (G3), washed with methanol and dried in vacuum at 60° C. for 8 hr. As a result, 1.9 g of polymer was obtained. The molecular weight (in terms of polypropylene) of this polymer was measured by GPC, and Mn and Mw were found to be 9700 and 99,600, respectively.

This polymer was subjected to IR spectroscopic analysis, in which the C=O stretching vibration band at 1735 cm$^{-1}$ was recognized. Therefore, the presence of polypropylene having the following structure was demonstrated:

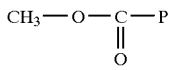

wherein P represents a polymer chain group.

Example 4

[Preparation of solid titanium catalyst component (A)-2]

95.2 g of anhydrous magnesium chloride, 442 ml of decane and 390.6 g of 2-ethylhexyl alcohol were heated at 130° C. for 2 hr to thereby obtain a homogeneous solution. 21.3 g of phthalic anhydride was added to this solution and stirred at 130° C. for 1 hr to thereby dissolve the phthalic anhydride. The resultant homogeneous solution was cooled to room temperature. 75 ml of this homogeneous solution was dropped into 200 ml of titanium tetrachloride cooled at −20° C. over a period of 1 hr. After the completion of the dropping, the temperature of the mixture was raised to 110° C. over a period of 4 hr. 5.22 g of diisobutyl phthalate was added to the mixture at 110° C. and stirred for 2 hr while maintaining the temperature. Solid contents were separated by a hot filtration after the completion of 2-hr reaction and re-suspended in 275 ml of titanium tetrachloride. Further, a thermal reaction was carried out at 110° C. for 2 hr.

After the completion of the reaction, solid contents were again separated by a hot filtration and satisfactorily washed with 110° C. decane and room temperature hexane until free titanium compounds were no longer detected in the filtrate.

[Synthesis of terminal-modified polymer (B)-2]

A decane slurry containing terminal-modified polymer (B)-2 was obtained in the same manner as in Example 1, except that the solid titanium catalyst component (A)-2 was employed in place of the solid titanium catalyst component (A) and that the polymerization reaction was performed at 95° C. for 20 min in place of 100° C. for 1 hr.

[Identification of terminal-modified polyolefin (B)-2]

A white polymer was obtained from the above obtained slurry in the same manner as in Example 1.

A terminal group determination of the white polymer was performed in the same manner as in Example 1. As a result, it was found that ethyl (Et), n-propyl (n-Pr), i-butyl (i-Bt) and n-butyl (n-Bt) were present as terminal groups in a molar proportion of 40 (Et): 10 (n-Pr): 44 (i-Bt): 6 (n-Bt).

Therefore, it was found that the above white polymer contained polymer formed by solvolysis of terminal-modified polyolefin in an amount of about 80%. Namely, it was found that polyolefin having —Al(C$_2$H$_5$)$_2$ at its terminal was contained in an amount of about 80% in the polymer of the above decane slurry containing terminal-modified polyolefin (B)-2.

[Synthesis of polyolefin (C)-4 having a functional group at its terminal]

The above obtained slurry was held at 60° C., and the nitrogen gas was switched to oxygen gas. While maintaining the above temperature, oxygen gas was continuously fed into the slurry at 20 N-lit./hr for 3 hr. The resultant mixture was put in a liquid mixture of a small amount of concentrated hydrochloric acid and 2 lit. of methanol and stirred. The stirring was conducted for 30 min, 2 lit. of methanol was added and further stirring was conducted for 30 min. Precipitated polymer was separated by filtration through a glass filter (G3), washed with methanol and dried in vacuum at 60° C. for 8 hr. As a result, 13.3 g of polymer was obtained. The molecular weight (in terms of polypropylene) of this polymer was measured by GPC, and Mn and Mw were found to be 10,100 and 96,500, respectively.

150 mg of this polymer was dissolved in a mixture of 0.5 ml of hexachlorobutadiene and 0.1 ml of benzene deuteride at 120° C. The thus obtained sample was analyzed by means of $^{13}$C-NMR in the same manner as in Example 1, thereby determining terminal group of the polymer.

A peak assigned to secondary carbon of a polypropylene terminal of isobutyl group structure which neighbored hydroxyl group (HO—) was clearly recognized at δ (ppm)= 67.7. Therefore, the presence of polypropylene having a terminal of the following structure was demonstrated:

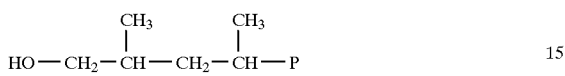

wherein P represents a polymer chain group.

Comparative Example 1

[Synthesis of polyolefin (C)-5 having a functional group at its terminal]

The decane slurry of terminal-modified polyolefin (B) obtained in the same manner as in Example 1 was put in a liquid mixture of a small amount of concentrated hydrochloric acid and 2 lit. of methanol and stirred for 30 min. Then, 2 lit. of methanol was added and further stirring was conducted for 30 min. Precipitated polymer was separated by filtration through a glass filter (G3), washed with methanol and dried in vacuum at 60° C. for 8 hr. As a result, 1.8 g of polymer was obtained. The molecular weight (in terms of polypropylene) of this polymer was measured by GPC, and Mn and Mw were found to be 9800 and 97,400, respectively.

The above polymer was analyzed by means of $^{13}$C-NMR in the same manner as in Example 1. No peak assigned to secondary carbon was recognized in the vicinity of δ (ppm)= 49 to 50 and δ (ppm)=67 to 68.

Further, the above polymer was subjected to IR spectroscopic analysis, in which no C=O stretching vibration band was recognized.

Comparative Example 2

[Synthesis of terminal-modified polyolefin (B)-3]

A decane slurry containing terminal-modified polyolefin (B)-3 was obtained in the same manner as in Example 1 except that 10 mmol of diethylzinc, 3 mmol of triethylaluminum, 0.3 mmol of diphenyldimethoxysilane and 0.05 mmol, in terms of titanium atom, of the above solid titanium catalyst component (A) were charged in this order in place of the addition of 3 mmol of triethylaluminum, 0.3 mmol of diphenyldimethoxysilane and 0.05 mmol, in terms of titanium atom, of the above solid titanium catalyst component (A) in this order.

[Synthesis of polyolefin (C)-6 having a functional group at its terminal]

The above obtained slurry was held at 60° C., and the nitrogen gas was switched to oxygen gas. While maintaining the above temperature, oxygen gas was continuously fed into the slurry at 20 N-lit./hr for 3 hr. The resultant mixture was put in a liquid mixture of a small amount of concentrated hydrochloric acid and 2 lit. of methanol and stirred. The stirring was conducted for 30 min, 2 lit. of methanol was added and further stirring was conducted for 30 min. However, no polymer precipitation occurred.

We claim:

1. A process for producing a polyolefin having a functional group at its terminal, which comprises:

step (A) producing a terminal-modified polyolefin of the formula:

wherein P represents a polymer chain obtained by a homopolymerization or copolymerization of an olefin of the formula $CH_2=CHR^3$ in which $R^3$ is a group or an atom selected from among hydrocarbon groups having 1 to 10 carbon atoms, a hydrogen atom and halogen atoms and each of $R^1$ and $R^2$ independently represents a group or an atom selected from among hydrocarbon groups having 1 to 10 carbon atoms, a hydrogen atom and halogen atoms, in the presence of an olefin polymerization catalyst composed of a solid titanium catalyst component (a) including titanium and a halogen as essential components and an organoaluminum compound catalyst component (b) or an olefin polymerization catalyst composed of said components (a) and (b) and an organosilicon compound (c); and step (B) producing a polyolefin of the formula:

wherein P represents a polymer chain obtained by a homopolymerization or copolymerization of an olefin of the formula $CH_2=CHR^3$ in which $R^3$ is a group or an atom selected from among hydrocarbon groups having 1 to 10 carbon atoms, a hydrogen atom and halogen atoms and X represents a functional group or a group having at least one functional group, by conducting a substitution reaction between —AlR$^1$R$^2$ group of the terminal-modified polyolefin obtained in the above step (A) and a compound having a functional group structure or by first conducting a substitution reaction between —AlR$^1$R$^2$ group of the terminal-modified polyolefin obtained in the above step (A) and a compound having such a structure that a functional group is formed by solvolysis and thereafter conducting solvolysis.

2. The process as claimed in claim 1, wherein, in the formula (I), P represents a polymer chain obtained by a homopolymerization or copolymerization of at least 20 olefin monomer units.

3. The process as claimed in claim 1, wherein, in the formula (I), P represents a polymer chain obtained by a homopolymerization or copolymerization of 50 to 10,000 olefin monomer units.

4. The process as claimed in any of claims 1 to 3, wherein, in the step (A), an olefin is polymerized at 70° C. or higher.

5. The process as claimed in claim 1, wherein the step (A) is performed in the absence of hydrogen.

6. The process as claimed in claim 1, wherein in the formula (II), X represents —COOR, —OR or a halogen, wherein R is a member selected from the group consisting of a hydrocarbon group having 1 to 10 carbon atoms and a hydrogen atom.

7. The process as claimed in claim 1, wherein the polyolefin represented by the formula (II) has an Mw/Mn ratio of at least 3.

8. A process for producing a polyolefin having a functional group at its terminal, which comprises:

step (A) producing a terminal-modified polyolefin of the formula:

wherein P represents a polymer chain of 50 to 10,000 olefin monomer units obtained by a homopolymerization or copolymerization of an olefin of the formula $CH_2=CHR^3$ at a temperature of at least 70° C. in which $R^3$ is a group or an atom selected from among hydrocarbon groups having 1 to 10 carbon atoms, a hydrogen atom and halogen atoms and each of $R^1$ and $R^2$ independently represents a group or an atom selected from among hydrocarbon groups having 1 to 10 carbon atoms, a hydrogen atom and halogen atoms, in the presence of an olefin polymerization catalyst composed of a solid titanium catalyst component (a) including titanium and a halogen as essential components and an organoaluminum compound catalyst component (b) or an olefin polymerization catalyst composed of said components (a) and (b) and an organosilicon compound (c); and step (B) producing a polyolefin of the formula:

P-X　　　　　　　　　　　　　(II)

wherein P represents a polymer chain obtained by a homopolymerization or copolymerization of an olefin of the formula $CH_2=CHR^3$ in which $R^3$ is a group or an atom selected from among hydrocarbon groups having 1 to 10 carbon atoms, a hydrogen atom and halogen atoms and X represents a functional group or a group having at least one functional group, by conducting a substitution reaction between —$AlR^1R^2$ group of the terminal-modified polyolefin obtained in the above step (A) and a compound having a functional group structure or by first conducting a substitution reaction between —$AlR^1R^1$ group of the terminal-modified polyolefin obtained in the above step (A) and a compound having such a structure that a functional group is formed by solvolysis and thereafter conducting solvolysis.

9. The process as claimed in claim 8, wherein the step (A) is performed in the absence of hydrogen.

10. The process as claimed in claim 8, wherein, in the formula (II), X represents —COOR, —OR or a halogen, wherein R is a member selected from the group consisting of a hydrocarbon group having 1 to 10 carbon atoms and a hydrogen atom.

11. The process as claimed in claim 8, wherein the polyolefin represented by the formula (II) has an Mw/Mn ratio of at least 3.

12. The process as claimed in claim 8, wherein, in the step (A), an olefin is polymerized at 85 to 140° C.

13. The process as claimed in claim 8 or claim 12 wherein, in the step (A), an olefin is polymerized at a pressure of atmospheric pressure to 100 kg/cm$^2$.

* * * * *